3,477,912
METHOD OF PRODUCTION OF UROKINASE
Nathan H. Sloane, Germantown, Tenn., assignor to Century Laboratories, Inc., a corporation of Delaware
No Drawing. Continuation-in-part of application Ser. No. 625,019, Mar. 22, 1967. This application July 7, 1967, Ser. No. 651,707
Int. Cl. C12d; C07g 7/02
U.S. Cl. 195—66                                              6 Claims

ABSTRACT OF THE DISCLOSURE

An aqueous solution of semi-purified urokinase which contains extraneous protein and coloring components is purified by treatment with controlled concentrations of versene (ethylene diamine tetra-acetic acid) and DEAE cellulose (diethylaminoethyl cellulose) at slightly alkaline pH values. At versene concentrations of about 0.005 M and above and at slightly alkaline pH values these extraneous materials will be adsorbed on the DEAE cellulose while the urokinase remains in solution. The extraneous materials, therefore, can be separated and discarded by removing the cellulose on which they are adsorbed while the purified urokinase solution is retained for further treatment by dialysis. In a similar manner a solution of urokinase in dilute versene solution below about 0.0025 M will be adsorbed onto the cellulose. As the versene concentration is increased by the addition thereof the urokinase is eluted from the cellulose, the various other contaminants remaining adsorbed on the cellulose. To stabilize the urokinase during dialysis and after its elution from the DEAE cellulose, glucose is added to a concentration of from 0.05 to 0.10 M.

CROSS REFERENCES TO RELATED APPLICATIONS

This application is a continuation-in-part of my corresponding applications Ser. Nos. 586,968 and 625,019, filed Oct. 17, 1966 and Mar. 22, 1967 respectively.

BACKGROUND OF THE INVENTION

Field of the invention

This invention relates to a method for the further purification of a semi-purified urokinase concentrate. In particular it relates to a method wherein a urokinase-containing protein solution, obtained by the precipitation of urine with tannic acid which is then purified by treatment wth cold butyl alcohol, precipitated with dilute acid and dissolved in ethyl alcohol, is purified and concentrated by means of a series of selective adsorption and elution steps. The urokinase obtained thereby is in a highly purified and concentrated state.

Description of prior art

Urokinase is an enzyme cofactor which stimulates the production in the blood of the clot-dissolving proteolytic enzyme, plasmin. Urokinase is, accordingly, used in the treatment of persons having various circulatory disorders such as those which tend to cause the formation of blood clots.

Human urine is an excellent source of urokinase particularly in view of the great quantity of urine which is available for processing. Therefore, a method which utilizes human urine as a source of urokinase is economically desirable.

Large volumes of urine are required to obtain sufficient amounts of urokinase. Therefore, it is desirable to have a method wherein a urokinase-rich fraction of comparatively small unit volme can be quickly and efficiently isolated therefrom. Heretofore, urokinase has been obtained from urine by adsorption on benzoc acid. This adsorption process, however, requires the use of a great number of cumbersome and inefficient steps. Moreover, although tannic acid has been added to urine in order to precipitate the proteinaceous components thereof for purposes other than obtaining urokinase, I am aware of no method which has been proposed whereby urokinase is extracted from the tannic acid precipitate of urine.

A method for the tannic acid precipitation of urokinase from urine has been disclosed in my copending U.S. application Ser. No. 586,968, filed Oct. 17, 1966 and a further method for purifying and concentrating the urokinase obtained therefrom is disclosed in my copending U.S. application Ser. No. 625,019, filed Mar. 22, 1967. This application is a continuation-in-part of both the foregoing applications.

Tannic acid is an effective urine precipitant, by means of which one can efficiently precipitate urokinase in one step from large quantities of urine. This precipitation step effectively reduces, immediately in the process, the great bulk of material that must be handled in further isolating and purifying the urokinase. It provides a crude urokinase-containing protein concentrate which is rich in urokinase and comparatively small in unit volume. I have found that when cold butyl alcohol is added to a slightly alkaline solution of the crude urokinase concentrate and the mixture shaken, the urokinase remains in solution, whereas the other proteinaceous materials precipitate out in the form of a gel on the surface of the solution. This gel can then be readily separated and discarded. When dilute acid is added to the semi-purified urokinase solution obtained in the manner described, the urokinase precipitates out of the solution. The urokinase precipitate is then dissolved in ethyl alcohol and dialyzed which reprecipitates the urokinase in a purified form. The purified urokinase can then be dissolved in a dilute alkaline solution and again dialyzed to produce a highly concentrated urokinase solution. The urokinase obtained by these procedures, although highly concentrated and purified, contains, nevertheless, other impurities such as extraneous protein and certain coloring components. These impurities should be removed if the urokinase is to be sufficiently pure and concentrated for use in humans.

SUMMARY OF THE INVENTION

This invention provides a means for further purifying and concentrating the semi-purified urokinase concentrate solution which is produced by the methods of my copending applications. It has been discovered that when urokinase is present in a slightly alkaline solution (pH 7.4) of versene (ethyl diamine tetra-acetic acid) at versene concentrations in the range from 0.005 M to 0.05 M, and DEAE cellulose (diethyl aminoethyl cellulose) is added to the solution and mixed therewith, the urokinase will not adsorb on the cellulose while extraneous proteinaceous material and coloring components will be adsorbed. The purified and concentrated urokinase is then separated from the impurity-containing cellulose which is discarded.

It has also been discovered that when the slightly alkaline versene solution of urokinase is sufficiently diluted with water to bring the versene concentration well below 0.0025 M the urokinase will be adsorbed on the cellulose. The supernatant liquid containing other extraneous proteinaceous materials can then be separated from the urokinase-containing cellulose and discarded. The cellulose which contains the urokinase is then further treated by repeated washings with buffer solution. Versene solution is then added to the cellulose and the pH is adjusted to a value of about 7.4. Upon the addition of versene to the cellulose and resultant increase in the concentration thereof, the urokinase is eluted from the cellulose. The cellulose with the impurities trapped therein is discarded and the urokinase-versene solution is treated by dialysis to eliminate the versene, leaving behind the purified and concentrated urokinase which is collected. Dialysis of the urokinase should be carried out in the presence of glucose which acts as a stabilizer for the urokinase.

DESCRIPTION OF THE PREFERRED EMBODIMENTS

According to the present invention, a slightly alkaline (about pH 7.4) solution of versene is added to a concentration of about 0.005 M to a semi-purified aqueous solution of urokinase concentrate. To this versene solution of urokinase is added a suspension of DEAE cellulose and the mixture is stirred. The presence of the versene at this concentration, under slightly alkaline conditions, prevents the adsorption of the urokinase on the cellulose. Although a versene concentration of 0.005 M is specified herein I have found that a range of from 0.005 M to 0.05 M is effective for this purpose. The coloring components and other extraneous protein present in the solution, however, are readily adsorbed on the cellulose under these conditions. The cellulose is then separated by centrifugation and discarded while the versene solution of urokinase is collected. This solution is then dialyzed to remove the versene while leaving the urokinase in a highly purified and concentrated form. Dialysis is performed in the presence of glucose which is at a concentration of 0.05 M to 0.10 M in the solution. The glucose stabilizes the urokinase and prevents its decomposition during dialysis.

The urokinase can be further purified by adding water to a versene-urokinase solution in order to dilute the versene concentration to a level well below 0.0025 M. After a sufficient dilution of the versene has been accomplished, it no longer prevents the urokinase from being adsorbed onto cellulose. At this point a DEAE cellulose suspension is added to the dilute urokinase-versene solution and the urokinase is then adsorbed onto the cellulose. The cellulose is separated from the solution by centrifugation and the supernatant solution which contains various impurities is discarded. The cellulose is then washed with 0.05 M tris (hydroxymethyl) aminomethane buffer solution at pH 7.4. The urokinase is then eluted from the cellulose by increasing the versene concentration to a level above 0.01 M through the addition of versene in tris buffer solution at a slightly alkaline pH value. The cellulose, which contains various impurities, is then separated by centrifugation and is discarded. The supernatant liquid which contains the urokinase is retained. The urokinase-versene solution is then dialyzed to remove the versene and the urokinase which is retained is in a highly purified and concentrated form.

The following examples illustrate the processes of the invention in greater detail.

EXAMPLE I

To 5 ml. of an aqueous solution of urokinase concentrate obtained by the tannic acid precipitation of urine (equivalent to one liter of urine) and purified as described in my copending applications, identified herein, is added versene to a concentration of 0.01 M and the pH of the solution is adjusted to 7.4. To this solution is added 5 ml. of a DEAE cellulose suspension containing 26 mg. of washed cellulose per ml. of suspension. The mixture is stirred for 40 minutes and its temperature is maintained at a temperature between 0° C. and 20° C. The cellulose is then removed by centrifugation and the supernatant liquid which contains the enzymatic activity (urokinase) is collected. To the versene solution of urokinase is added glucose to a concentration of from 0.05 M to 0.10 M and the solution is dialyzed to remove the versene. The specific activity of urokinase is increased by this purification step from approximately 10,000 CTA units to 20,000 CTA units per mg. of protein (a CTA unit is a measure of the activity of urokinase).

EXAMPLE II

To 10 ml. of the urokinase solution obtained in Example I is added 10 ml. of a DEAE cellulose suspension containing 26 mg. of washed cellulose per ml. of suspension. This mixture is stirred for one hour at a temperature between 0° C. and 20° C. and the cellulose which has adsorbed the urokinase is recovered by centrifugation (the supernatant solution is discarded). The cellulose is washed several times with 5 ml. volumes of 0.05 M tris buffer. The urokinase is eluted from the cellulose by suspending the washed cellulose in a 0.05 M tris-0.05 M versene solution which is adjusted to pH 7.4. This mixture is stirred for one hour at 4° C. The cellulose is then removed by centrifugation and the supernatant liquid which contains the urokinase is collected. To this urokinase-containing solution is added glucose to a concentration of from 0.05 M to 0.10 M. The specific activity of the urokinase is thereby increased from approximately 20,000 CTA units to 40,000 CTA units per mg. of protein.

I claim:
1. A method for purifying and concentrating an aqueous solution of a semi-pure urokinase concentrate which comprises:
  (i) adding versene to said solution to a concentration in the range from 0.005 M to 0.05 M;
  (ii) adjusting the pH of said solution to a slightly alkaline value;
  (iii) adding a DEAE cellulose suspension to said solution and mixing, the mixture being kept at a temperature in the range from 0° C. to 20° C. during mixing;
  (iv) removing the cellulose; and
  (v) collecting the soluble urokinase concentrate solution.

2. A method according to claim 1 in which said pH is at a value of about 7.4 and said versene solution is at a concentration of about 0.05 M.

3. A method according to claim 2 in which said cellulose is removed by centrifugation and said soluble urokinase concentrate solution is dialyzed against buffer in the presence of glucose to remove impurities.

4. A method for further purifying the soluble urokinase concentrate solution produced in accordance with claim 1 which comprises:
  (i) diluting said urokinase solution to bring the versene concentration below 0.01 M;
  (ii) adding a DEAE cellulose suspension to said solution and mixing, the mixture being kept at a temperature in the range from 0° C. to 20° C. during mixing;
  (iii) separating and collecting the cellulose;
  (iv) washing the cellulose with buffer solution;
  (v) suspending the washed cellulose in a solution of versene and buffer and adjusting the pH of said solution to a slightly alkaline value;
  (vi) removing the cellulose;
  (viii) collecting the soluble urokinase concentrate solution; and
  (viii) adding glucose to a concentration in the range from 0.05 M to 0.10 M to said urokinase solution.

5. A method according to claim 4 in which said mixture is kept at a temperature of about 0° C. during mixing and said pH is at a valueof about 7.4.

6. A method according to claim 5 in which said cellulose is removed by centrifugation and said soluble urokinase concentrate solution obtained thereby is dialyzed against buffer in the presence of glucose to remove impurities.

References Cited

UNITED STATES PATENTS 3,184,394   5/1965   Schmidtberger et al. __ 195—66

LIONEL M. SHAPIRO, Primary Examiner